United States Patent [19]

Kawamura et al.

[11] 3,900,459

[45] Aug. 19, 1975

[54] PROCESS FOR PREPARING HIGH MOLECULAR WEIGHT AZO PIGMENT

[75] Inventors: Kimihide Kawamura, Koshigaya; Shojiro Horiguchi, Tokyo, both of Japan

[73] Assignee: Dainichieseika Color & Chemicals Mfg. Co., Ltd., Tokyo, Japan

[22] Filed: Mar. 15, 1973

[21] Appl. No.: 341,793

[30] Foreign Application Priority Data
Nov. 16, 1972 Japan.............................. 47-114250

[52] U.S. Cl. ............... 260/157; 260/161; 260/144; 260/162; 260/163; 260/176; 260/181; 260/184; 260/193; 260/204
[51] Int. Cl. ........................ C09b 31/02; C09b 33/02; C09b 35/02
[58] Field of Search ........... 260/157, 160, 161, 162, 260/163, 176, 181, 184, 193, 202, 203, 204

[56] References Cited
UNITED STATES PATENTS

| | | | |
|---|---|---|---|
| 3,169,955 | 2/1965 | Siebert et al........................ | 260/176 |
| 3,382,228 | 5/1968 | Ferrari et al........................ | 260/158 |
| 3,441,556 | 4/1969 | Scheitlin............................. | 260/192 |
| 3,627,750 | 12/1971 | Ronco................................. | 260/174 |
| 3,793,305 | 2/1974 | Balon.................................. | 260/154 |

OTHER PUBLICATIONS

Houben–Weyl, "Methoden Derorganischen Chemie," Volume 10/3, pages 28 to 32 (1965).

Primary Examiner—Floyd D. Higel
Attorney, Agent, or Firm—Oblon, Fisher, Spivak, McClelland & Maier

[57] ABSTRACT

A process is described for the preparation of high molecular weight azo pigments characterized by high crystallinity and clear hue by coupling a diazo component with a coupling component wherein the improvement in the process comprises preparing a solution or partial dispersion of said diazo component by diazotizing a primary aromatic amine in a hydrophobic organic solvent, preparing a solution or partial dispersion of said coupling component by mixing said coupling component in a hydrophobic organic solvent and forming a coupling reaction mixture by mixing a solution or partial dispersion of said diazo component with a solution or partial dispersion of said coupling component.

5 Claims, No Drawings

PROCESS FOR PREPARING HIGH MOLECULAR WEIGHT AZO PIGMENT

BACKGROUND OF THE INVENTION

1. Field of the Invention

This invention relates to the preparation of high purity azo pigments in high yield which are characterized by high crystallinity and clear hue.

2. Description of the Prior Art

Heretofore, azo pigments have been widely prepared by the following processes.

1. Preparation of azo pigments in aqueous medium high molecular weight azo pigments by using a diazo component with high molecular weight and/or a coupling component with high molecular weight.

2. Preparation of high molecular weight azo pigments from low molecular weight azo pigments It is difficult to prepare azo pigments having high molecular weight by process (1) described above. In the past, one method of preparing azo pigments with high molecular weight has been to first prepare azo compounds having low molecular weight (I) and then react the product with another organic compound (II) to yield high molecular weight azo pigments (III) as follows:

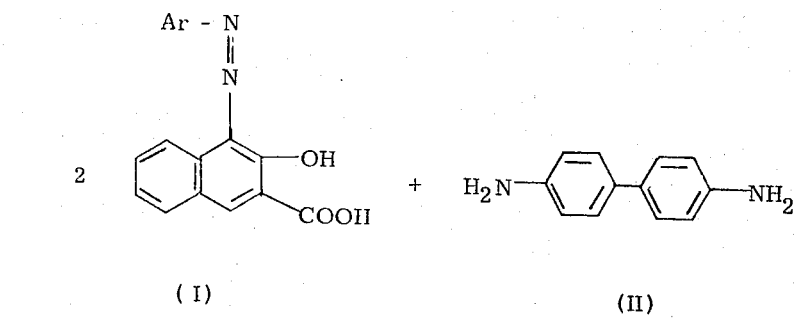

(I)          (II)

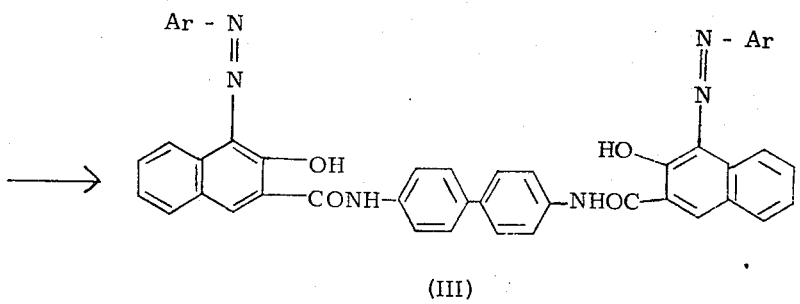

(III)

An aromatic primary amine (diazo component) is reacted with a nitrite in a mineral acid to yield a diazonium salt. The diazonium salt is coupled with a coupling component which is prepared by dissolving or dispersing a coupling component in water, to yield an azo pigment. Usually, the process has been used for the preparation of relatively low molecular weight azo pigments. However, the process has the following disadvantages.

a. Since diazonium salts generally are unstable in water, diazonium salts decompose in the diazotizing operation and the coupling operation. The decomposed products are water-insoluble and are contained in the azo pigments. This decreases the purity of the pigments and gives them an unclear hue.

b. Generally, the resulting pigments have low crystallinity which results in pigments with low light fastness and low heat resistance. In order to improve the properties of the pigments, the pigments may be recrystallized from a hydrophobic organic solvent.

c. If the diazo component or the coupling component or both of them are water insoluble or sparingly soluble, either the diazo reaction or the coupling reaction is insufficient. Therefore, it is not suitable to prepare However, this type of process has the following disadvantages.

a. If a low molecular weight azo compound (I) is used in the coupling reactions, the disadvantage of process (1) - a is incurred.

b. Many steps are required for the overall reaction, and the process is complicated by the many steps and pieces of equipment required.

c. Differences in color and particle size, and crystallinity of the pigments occur in each lot of pigment produced because of the numerous steps required, thus rendering it difficult to obtain a uniform product.

3. Preparation of high molecular weight azo pigments by diazotization and coupling in a hydrophilic organic solvent such as methanol:

An approach has been made to overcome the difficulties associated with the preparation of azo pigments in aqueous media elucidated in (1) - (c) above by conducting the diazotization reaction and the coupling reaction in a hydrophilic organic solvent. Attempts have been made to synthesize high molecular weight azo pigments via diazotization and coupling in hydrophilic solvents in order to avoid the lengthy procedures of process (2) and the difficulties associated therewith. However, this approach has the following disadvantages.

a. Diazonium compounds are unstable and the diazonium groups are easily substituted by a hydrogen atom or an alkoxy group by reaction with a lower alcohol solvent such as methanol. In this process, methanol and the like are used as the medium for the diazotization reaction and the coupling reaction. However, extensive decomposition of the diazonium salts occurs during the diazotization reaction or the coupling reaction. As a result, the yield of high molecular weight azo pigment is low and decomposition products are contained therein as impurities. Thus it is difficult to obtain products having high purity.

b. The crystallinity of the azo pigments obtained from the reaction in hydrophilic solvents is very low. However, the crystallinity of the azo pigment product can be improved by a heat treatment in a hydrophobic organic solvent such as nitrobenzene to remove the interfering impurities. This purification process is complicated by the equipment required and the operational procedures necessary to affect the purification of the azo pigment. Further, purification of the azo pigments is complicated by the fact that the presence of a buffer is required in the coupling reaction in order to maintain essentially neutral reaction conditions by preventing substantial changes of pH. The buffer, however, promotes the decomposition of the diazonium salt, which provides a source of impurities, in addition to being present as an impurity in the azo pigment obtained. Thus, it is necessary to maintain low reaction temperatures in order to prevent the decomposition of the diazonium salt in the coupling reaction.

A need, therefore, exists for a method of conducting the diazotization reaction and the coupling reaction in the synthesis of high molecular weight azo pigments which avoids the tendency of diazonium salts to decompose and which reduces the impurity content of the azo pigment product.

SUMMARY OF THE INVENTION

Accordingly, one object of this invention is to provide a process for preparing high molecular weight azo pigments of high purity in high yield.

Another object of this invention is to provide a process for preparing high molecular weight azo pigments in which the diazotization reaction and the coupling reaction are conducted in a hydrophobic organic solvent.

Briefly, these objects and other objects of the invention as hereinafter will become readily apparent are achieved by a process for preparing azo pigments which comprises diazotizing the primary aromatic amine in a hydrophobic organic solvent to yield a solution containing a diazonium compound, and admixing said solution with a solution or dispersion of a coupling compound in a hydrophobic organic solvent whereby the coupling of said diazo compound with said coupling compound is conducted in a hydrophobic organic solvent.

DESCRIPTION OF THE PREFERRED EMBODIMENTS

In a study of the diazonium and coupling reactions involved in the synthesis of high molecular weight azo pigments, the following facts have been elucidated which reflect on the disadvantages of the process as described above.

1. It is possible to diazotize a primary aromatic amine (diazo component) in a hydrophobic organic solvent. Amines, which are difficult to diazotize in water or alcohol or which have high molecular weight, are easily diazotized in hydrophobic organic solvents.

2. The diazonium salts are remarkably stable in hydrophobic organic solvents compared to hydrophilic solvents such as water, alcohol and the like.

3. When a coupling component is added to a hydrophobic solvent to prepare a coupling solution and when the diazonium salt is admixed with the coupling solution, the coupling reaction for the synthesis of an azo pigment proceeds effectively.

4. In the coupling reaction, the diazonium salt is stable in the solvent and does not decompose before the coupling reaction is conducted. It is unnecessary to maintain the reaction at low temperatures, and the reaction can be conducted at room temperature.

5. The coupling reaction proceeds effectively even though it is conducted in a strongly acidic or strongly alkaline medium. It is unnecessary to add any buffering agent for control of pH.

6. After the coupling reaction, the purification and crystallization of the azo pigments can be conducted merely by heating the reaction mixture without transferring the contents of the reactor. Since a hydrophobic organic solvent is used as the medium for the coupling reaction, the purification and crystallization of the azo pigment can be conducted continuously.

7. When high molecular weight diazo pigments were prepared with coupling components having two coupling positions (e.g., bisacetoacetyl derivatives of various diamines or condensation products of a diamine and 3-hydroxynaphthoic acid) by the conventional process, monoazo compounds were produced first. These compounds were hydrophobic so that they precipitated in water or alcohol. Thus, the overall coupling reaction was too slow to obtain azo pigments of high quality. However, in accordance with the process of this invention, a hydrophobic organic solvent is used in the diazotization reaction, and the product monoazo compound has a high solubility in the solvent. Thus, the coupling reaction can be efficiently performed so as to obtain a high purity azo pigment in high yield.

Suitable aromatic amines used for the process of this invention can be all of the primary aromatic amines used for the conventional processes for preparing azo pigments and include amines such as (1) aniline, toluidine, anisidine, phenetidine, xylidine, and derivatives thereof, 2-,3- or 4-chloroaniline, 2-, 3- or 4-nitroaniline, 2,4-, 2,5- or 3,4-dichloroaniliine, 2-chloro-4-nitroaniline, 2-nitro-4-chloroaniline, 2-nitro-5-chloro-aniline, 2,5-dimethoxyaniline, 2,4,6-trimethylaniline, 4-benzyloxyaniline, 2-benzyloxy-5-chloroaniline, 5-chloro-2-(4-chlorophenoxy)-aniline, 2-(4-chlorophenoxy)-aniline, 5-chloro-2-phenoxyaniline, 4-cyclohexylaniline, 3,5-dichloro-2-phenoxyaniline, 2-phenoxyaniline, 4-phenylazoaniline, 2-(phenylsulfonyl)-aniline, o-, m- or p- toluidine, 6-chloro-3-trifluoromethylaniline 6-(ethylsulfonyl)-3-trifluoromethylaniline; 4-m-tolylazo-m-toluidine, 3-chloro-o-toluidine, 4-chloro-o-toluidine, 5-chloro-o-toluidine, 4-chloro-3-trifluoromethylaniline, 6-chloro-o-toluidine, 4-cyclohexyl-o-toluidine, 4-nitro-o-toluidine, 5-nitro-o-toluidine, 4-o-tolylazo-o-toluidine, 3-chloro-p-toluidine, 2-nitro-p-toluidine, 4-trifluoromethyl-2-aniline, 4-amino-5-chloro-o- tolylnitrile, 2,4-, 2,5-, 2,6-, 3,5-xylidine, 6-(2,4-xylylazo)-2,4-xylidine, 3,5-di(trifluoromethyl)aniline, o-, m- or p-anisidine, 4-chloro-o-ansidine, 5-chloro-o-anisidine, 5-chloro-4-nitroanisidine, 4-nitro-o-anisidine, 5-nitro-o-anisidine, 2-nitro-p-anisidine, 3-chloro-p-anisidine, 5-(ethylsulfonyl)-o-anisidine, 5-(p-phenyl-sulphonyl)-o-anisidine, 3-amino-p-anisanilide, 5-(benzylsulphonyl)-o-anisidine, 5-methyl-o-anisidine, 5-methyl-4-nitro-o-anisidine, o-anisidine-4-sulfondiethylamide, o-anisidine-4-sulfonbutylamide, o-, m-, p-phenetidine, 5-methyl-o-phenetidine, m-aminobenzonitrile, p-amino-2,5-dimethoxybenzonitrile; (2) aminobenzoic acid, aminobenzenesulfonic acid, aminophthalic acid and derivatives thereof, such as esters of 2-, 3- or 4-aminobenzoic acid, 2-, 3- or 4-aminobenzenesulfonic acid, 4-chloroanthranilic acid, 3,5-dichloroanthranilic acid, 3-amino-4-methoxybenzoic acid, 3-amino-4-nitrobenzoic acid, 4-amino-3-nitrobenzoic acid, 3-amino-4-methylthiobenzoic acid, 3-amino-4-carboxymethyl benzoic acid and the like wherein the types of esters include methyl, ethyl, propyl, butyl, cyclohexyl, phenyl, 2-,3- or 4-methylphenyl, 2-,3- or 4-chlorophenyl, 2-methyl-4-chlorophenyl, 2,4,5-trichlorophenyl, 3-methyl-4-chlorophenyl, 2,4-dichlorophenyl,3-trifluoromethylphenyl, 4-isobutylphenyl or 4-isooctylphenyl esters, esters of aminoterephthalic acid, 3-aminoisophthalic acid, 3-amino-phthalic acid, 4-aminophthalic acid, and the like wherein the types of esters include dimethyl, diethyl, dipropyl, dibutyl, dicyclohexyl or diphenyl esters, and 3- and 4-aminophthalimide, 3- or 4-aminophthal-N-methyl, ethyl or phenylimide, 5- or 6-amino-2,3-dihydro-1,4-phthalazinedione and the like; (3) benzanilide or benzenesulfonailide or derivatives thereof such as 3-aminobenzanilide, 4-aminobenzanilide, 4-chloro-3-aminobenzanilide, 4-chloro-3-aminobenz-3'-chloroanilide, 4-chloro-3-aminobenz-2', 5'-dichloroanilide, 2,4-dichloro-3-aminobenz-2', -5'-dichloroanilide, 2,4-dichloro-3-aminobenz-3'-trifluoromethylanilide, 2,4-dichloro-3-aminobenz-3'-chloroanilide, 4-chloro-3-aminobenz- 2'-methyl-3'-chloroanilide, 4-methyl-3-aminobenz-2',5'-dichloroanilide, 4-methyl-3-aminobenz-3'-trichloromethylanilide, 4-methoxy-3-aminobenz-3-chloroanilide, 4-methoxy-3-aminobenz-2-naphthylamide, 4-methoxy-3-aminobenz-2-napthylamide, 4-methoxy-3-aminobenz-(5',8'-dichloro)-2-naphthylamide, 3-amino-4-carboxymethyl benzanilide, 3-amino-4-carboxymethylbenz-2'-methyl-5'-chloroanilide, 1-aminobenzene-4-sulfanilide, 1-amino-2,5-dichlorobenzene-4-sulfanilide, 1-amino-2-methoxybenzene-4-sulfanilide, 1-amino-2,5-dimethoxybenzene-4-sulfanilide, 1 -amino-2,5-dimethoxybenzene-4-sulfo-2'-chloroanilide, 1-amino-2,5-dimethoxybenzene-4-sulfo-4'-chloroanilide, 1-amino-2,5-dimethoxybenzene-4-sulfo-3'-chloroanilide, 1-amino-2,5-dimethoxybenzene-4-sulfomorpholide, 1-amino-2,5-diethoxybenzene-4-sulfanilide, 1 -amino-2,5-diethoxybenzene-4-sulfo-4'-chloroanilide, 1-amino-2,5-diethoxybenzene-4-sulfo (2',5'-dichloroanilide), 1-amino-2-methoxybenzene-4-sulfanilide, 1-amino-2,5-dimethyl-4-sufanilide, 1-amino-2-methoxybenzene-5-sulfanilide, 1-amino-2,4-dimethoxybenzene-5-sulfanilide, 1-amino-2-methylbenzene-5-sulfanilide, 1-amino-2,4-dimethylbenzene-5-sulfanilide,-1-aminonaphthalene-4-sulfanilide; (4) phenylenediamine, benzidine, other diamines and derivatives thereof such as p-phenylenediamine, 2-methyl-, 2-chloro-, 2-methoxy-, 2-ethoxy-or 2-trifluoromethyl-p-phenylenediamine, 2,5-dimethyl-, 2,5 -dichloro-, 2,5-dimethoxy-, 2,5-diethoxy- or 2,5-ditrifluoromethyl-p-phenylenediamine, 2-chloro-5-methoxy-, 2-chloro-5-ethoxy- or 2-chloro-5-trifluoromethyl-p-phenylenediamine, 2-methyl-5-methoxy-, 2-methyl-5-ethoxy- or 2-methyl-5-trifluoromethyl-p-phenylenediamine, 2-methoxy-5-ethoxy- or 2-methoxy-5-trifluoromethyl-p-phenylene diamine, 2-ethoxy-5-trifluoromethyl-p-phenylene diamine, benzidine, 3,3'-dimethyl-3,3'-dichloro-, 3,3'-dimethoxy- or 3,3'-diethoxybenzidine, 3,3'-dimethoxy-2,2'-dichlorobenzidine, 1,5-diamino-napthalene, 4,4'-methylenedianiline, 4,4'-methylene-di-m-tolidine, 4,4'-methylene-di-2,5-xylidine, 3,3'-diaminobenzanilide, 4,4'-diaminobenzanilide, 4,4'-diamino-di-m-tolylamine and the like.

Other amines suitable include: 2-biphenylamine, 4-biphenylamine, 3-methoxy-4-aminodiphenylamine, 4'-methoxy-4-aminodiphenylamine, α-napthylamine, α-naphthylamine, β-napthylamine, α-aminoanthraquinone, β-aminoanthraquinone, N,N-dimethyl-p-phenylenediamine, 2-methoxy-N-phenyl-p-phenylenediamine, 5-aminobenzimidazolone, 1-methyl-5-aminobenzimidazolone, 1-methyl-6-chloro-5-aminobenzimidazolone, 1-ethyl-7-bromo-5-aminobenzimidazolone, 1-propyl-6-methoxy-5-aminobenzimidazolone, and the like.

Suitable coupling components which are useful in this invention include any of the conventional coupling components useful for the synthesis of azo pigments such as I Ar—NHCOCH$_2$COCH$_3$, (acetoanilides prepared by reacting ArNH$_2$ with acetoacetic ester or ketene dimer);

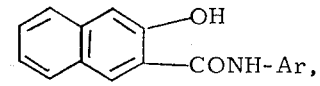

(2-hydroxy-3-naphthoic anilides prepared by reacting ArNH$_2$ with 2-hydroxy-3-naphoic acid);

III 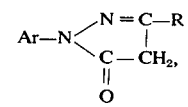

(1-aryl-pyrazolones prepared by diazotizing ArNH$_2$ and reducing the product and reacting the resulting arylhydrazine (Ar—NHNH$_2$) with acetoacetic ester);

IV 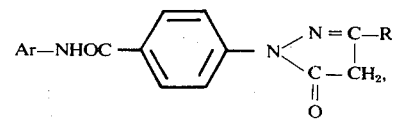

(the compounds prepared by reacting ArNH$_2$ with 1-(carboxyphenyl)pyrazolone);

V CH$_3$COCH$_2$COHN—Ar—NHOCCH$_2$COCH$_3$, (bisacetoacetyl compounds prepared by reacting $H_2N-Ar-NH_2$ with acetoacetic ester or ketene dimer);

VI

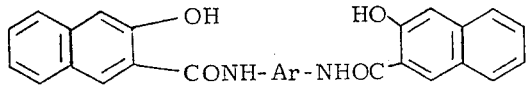

(the compounds prepared by reacting $H_2N-Ar-NH_2$ with 2-hydroxy-3-naphthoic acid);

VII

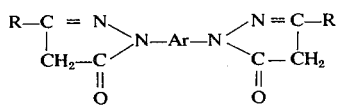

(the compounds prepared by tetrazotizing $H_2N-Ar-NH_2$, reducing the product and reacting the resulting hydrazine ($H_2NHN-Ar-NHNH_2$) with acetoacetic ester); and

VIII

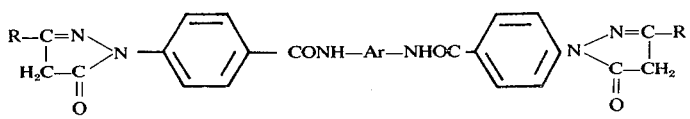

The formulas $ArNH_2$ and $H_2N-Ar-NH_2$ and the symbol R in the general structural formulas 1 –8 designate primary aromatic monoamines, primary aromatic diamines and $C_{1-4}$ alkyl groups respectively.

Suitable hydrophobic organic solvents useful in this invention are those organic solvents which are not completely miscible with water, and include aromatic solvents such as benzene, naphthalene, diphenyl, mono-, di-, tri-, tetra-chlorbenzene, 2-chloronaphthalene, chlorodiphenyl bromobenzene, bromonaphthalene, toluene, xylene, mesitylene, methylnaphthalene, ethylbenzene, cumene, butylbenzene, nitrobenzene, nitrotoluene, nitrochlorobenzene, anisole, phenetole, quinoline, acetophenone, alkylphthalate, and the like: and aliphatic solvents such as ligroin, petroleum benzine, mineral spirit, methylenechloride, chloroform, bromoform, carbon tetrachloride, trichloroethylene, perchloroethylene, tetralin, cyclohexane, cyclohexanone, methylisobutyl ketone, diisobutyl ketone, butylacetate, amylacetate, and the like.

Any mixtures of these solvents can be used as a solvent medium. In general, it is preferable to use aromatic solvents, especially those having a boiling point higher than 150°C. because the aromatic solvents in general more easily absorb and are miscible with hydrochloric acid and the like, and they are effective media for the recrystallization process after the coupling step. it is especially advantageous to use mono-, di-, tri- or tetra-chlorobenzene, nitrobenzene, nitrotoluene and nitrochlorobenzene. Although it is preferable to use a hydrophobic organic solvent alone, greater flexibility in the choice of solvent media is provided by the use of solvent media which consists of any one of the hydrophobic solvents listed and a small amount of a hydrophilic solvent such as an alcohol, a ketone, an organic acid or the like or water in a range of less than 30% by weight.

Suitable mineral acids useful in the diazotizing and coupling reactions include sulfuric acid, hydrochloric acid, phosphoric acid and the like. Preferably concentrated hydrochloric acid and hydrogen chloride gas are used. If hydrogen chloride gas is used, diazotization can be conducted during the introduction of the gas.

Suitable sources of nitric acid, which is used for the diazotization reaction can be any organic or inorganic source which can convert an amine to a diazonium compound. Preferably potassium or sodium nitrite is used. It is preferable to use said nitrite as a concentrated aqueous solution. However, it is also possible to use it as a powder.

The process of this invention will now be described in detail. A primary aromatic amine (diazo component) is first added to an organic solvent or a mixture thereof. Then more than 2 moles of concentrated $HC_1$ per mole of said amine is added to the solvent mixture. It is also possible to introduce hydrogen chloride gas instead of cpncentrated HCl into the medium containing the primary aromatic amine. The mixture is cooled to 0°–30°C and a concentrated aqueous solution or a powder of an equimolar amount or a small excess of nitrite to the amine is added dropwise to the mixture. Preferably, the mixture is stirred during this step.

The amount of organic solvent used varies depending upon the type of solvent, and is usually in a range of about 3–50 parts by weight per 1 part by weight of said amine. The state of the resulting diazonium solution depends upon the amine used, and is a solution or a partially dissolved dispersion. Both of these media are remarkably stable in comparison to the media obtained with water or an alcohol.

A coupling solution is prepared by adding a coupling component to an organic solvent or a mixture of solvents. Choice of the solvent is dependent upon the type of coupling component used. For example, if a coupling component having the formula II or VI is used, the coupling component is added to a solvent and a concentrated solution of a suitable amount of an alkali such as sodium hydroxide in water or methanol is added to the mixture with stirring. Suitable amounts of alkali range from 1–5 moles per mole of coupling component when coupling compound II is used, and when coupling component VI is used, the amount of alkali ranges from 2–10 moles per mole of coupling component. When the alkali is added to the mixture, the coupling component completely dissovles at first, and then precipitates as a fine precipitate. The other coupling components I, II–V, VII and VIII can be used by simply adding the component to said organic solvent.

When an organic acid such as formic acid, acetic acid or an inorganic acid such as hydrochloric acid is added to the coupling solution, the solubility of the coupling component increases so that a true solution is immediately formed or forms a true solution at room temperature. If no acid is added to the mixture, the coupling component forms a dispersion at room temperature. When the mixture is heated, the coupling component dissolves. The amount of the organic solvent used for the preparation of the coupling solution ranges from about 3–100 parts by weight per 1 part by weight of said coupling component.

In the reaction of the diazonium compound with the coupling component, a solution containing the former can be added to a solution of the latter, or vice versa. In the coupling reaction of this invention, the coupling reaction can be smoothly performed under acidic conditions or alkaline conditions. If a coupling component having the formula I, III–V, VI or VII is used, the smoothness of the coupling reaction is dependent upon increasing the concentration of acid used. This fact cannot be deduced from conventional processes. Thus, in this invention, it is unnecessary to control the pH by adding a buffering agent, or the like to the reaction solution.

It is unnecessary to control the reaction temperature because the diazonium compounds do not decompose at room temperature or temperatures higher than room temperature. However, it is preferable to conduct the reaction at 20°–50°C, from the viewpoint of the operational considerations. The reaction time and temperature are dependent upon the type of diazonium compound and coupler used. Usually, the reaction is complete within 1–30 hours.

The crude pigment product can be used for certain applications. However, usually the high molecular weight azo pigments have low crystallinity, so it is necessary to purify the pigments by recrystallization. In the process of this invention, the reaction mixture is heated after the coupling reaction to evaporate the small amount of low boiling material remaining (e.g., water, organic acid, and the like), and then is heated at 100°–250°C for 1–30 hours with stirring. During the heat treatment, a small amount of impurities is dissovled and crystals of the pure pigment are obtained from the crude pigment. After the suspension is cooled and filtered, the solvent is removed to yield the product. If a low boiling solvent is used in the coupling reaction, and if the purification by recrystallization is directly performed, the overall process takes a long time. Accordingly, it is preferable to substitute a high boiling solvent for a low boiling solvent after the coupling reaction.

In accordance with the process of this invention, high purity azo pigments can be obtained in high yield. The reasons for this are as follows:

1. In the diazotization reaction, the diazonium compound is quantatively produced and is stable so that few impurities are produced by the decomposition of the diazonium compound. This is directly attributable to the elimination of a reactive solvent such as water or alcohol or to the minimal presence of water or alcohol.

2. The coupling solution is either a true solution or a fine dispersion which renders the coupling reaction very easy, because a hydrophobic organic solvent is used as the solvent medium.

3. Because the coupling reaction is performed under strongly acidic conditions, decomposition of the diazonium compound is essentially avoided in the coupling reaction. This is rather unusual when one of the coupling components I, III, V, VI or VII is used.

The following advantages have been found when the process of this invention is used.

1. It is unnecessary to control the coupling reaction temperature after diazotization since the diazonium compound formed is stable.

2. It is unnecessary to add a buffering agent or a dispersing agent, and to control the pH in the preparation of the coupling solution.

3. It is unnecessary to control pH in the coupling reaction.

4. Purification by recrystallization can be performed by heating the reaction mixture itself after the coupling reaction.

When the process of this invention is applied to the preparation of high molecular weight azo pigments, the advantages of this invention are especially valuable. For example, when an azo pigment is prepared by reacting a low molecular weight diazo component such as amine (1) with a low molecular weight coupling component, a high quality product can be obtained by the conventional process even though the overall operation is complicated. However, when (a) a high molecular weight diazo component such as amine (3) is used, or when (b) a high molecular weight coupling component such as coupling components V–VII or the coupling component I prepared from amine (3) is used or when (c) both of them are used, it is difficult to obtain azo pigments having high purity, high crystallinity, high quality and high molecular weight in high yield.

Having generally described this invention, a further understanding can be obtained by reference to certain specific examples which are provided herein for purpose of illustration only and are not intended to be limiting unless otherwise specified. In the examples, the terms "part" and "percent" signify parts by weight and percent by weight respectively unless otherwise specified.

EXAMPLE 1

62.6 Parts of 35% HCl were added to a solution of 12.7 parts of 3,3'-dichlorobenzidine in 253 parts of chlorobenzene. The mixture was cooled at 0°–5°C and a solution of 6.9 parts of sodium nitrite in 20 parts of water was added dropwise to the mixture to conduct the diazotization reaction to give a suspension of a partially dissolved diazonium salt.

20 Parts of 35% HCl was added to a solution of 17.4 parts of 1-phenyl-3-methyl-5-pyrazolone in 400 parts of nitrobenzene to prepare the coupling solution. The suspension of the prepared diazonium salt was added to the coupling solution at once, and the mixture was stirred at 20°–30°C for 5 hours to conduct the coupling reaction. After coupling, the reaction mixture was heated to 50°–60°C, stirred for 30 minutes, filtered, washed with methanol, washed with water and dried to yield an orange colored pigment.

EXAMPLE 2

62.6 Parts of 35% HCl was added to a solution of 12.7 parts of 3,3'-dichlorobenzidine in 253 parts of nitrobenzene and the mixture was cooled and maintained at 0°–5°C. A solution of 6.9 parts of sodium nitrite in 20 parts of water was added dropwise to the mixture to conduct a diazotization reaction which gave a suspension of a partially dissolved diazonium salt.

30.0 Parts of 35% HCl was added to a solution of 27.2 parts of acetoacetic-2,5-dimethoxy-4- chloroanilide in 400 parts of nitrobenzene to prepare the coupling solution. The suspension of the prepared diazonium salt was added to the coupling solution at once, and the mixture was stirred at 20°–30°C for 8 hours to conduct the coupling reaction. After coupling, the reaction mixture was heated to 50°–60°C, stirred for 30 minutes, filtered, washed with methanol, washed with water and dried to yield a reddish yellow colored pigment.

EXAMPLE 3

31.3 Parts of 35% HCl was added to a solution of 20 parts of 2,4,5-trichloroaniline in 400 parts of o-dichlorobenzene, and the mixture was cooled and maintained at 0°–5°C. A solution of 6.9 parts of sodium nitrite in 20 parts of water was added dropwise to the mixture to conduct a diazotization reaction so as to give a partially dissolved suspendion of the diazonium salt.

A solution of 16 parts of sodium hydroxide in 90 parts of methanol was added to a suspension of 27.7 parts of 2-hydroxy-3-naphthoic-o-toluidide in 277 parts of o-dichlorobenzene to prepare a coupling solution. (A solution of sodium hydroxide in water in the presence of the toluidide can be used instead.) The solution of the prepared diazonium salt was added dropwise to the coupling solution at room temperature to conduct the coupling reaction. After coupling, the reaction mixture was heated to 50°–60°C, stirred for 1 hours, filtered, washed with methanol, washed with water, dried and crushed to yield a yellowish red colored pigment.

EXAMPLE 4

31.3 Parts of 35% HCl was added to a solution of 30.8 parts of 2,5-dimethoxyaniline-4-sulfoanilide in 616 parts of nitrobenzene, and the mixture was cooled and maintained at 0°–5°C. A solution of 6.9 parts of sodium nitrite in 20 parts of water was added dropwise to the mixture to conduct a diazotization reaction so as to give a partially dissolved suspension of the diazonium salt.

20 Parts of 35% HCl was added to a solution of 27.2 parts of acetoaceto-2,5-dimethoxy-4-chloroanilide in 400 parts of nitrobenzene to prepare a coupling solution. The suspension of the prepared diazonium salt was added to the coupling solution at once, and the mixture was stirred at 20°–30°C for 5 hours to conduct the coupling reaction. After coupling, the reaction mixture was heated to 50°–60°C, stirred for 30 minutes, filtered, washed with methanol, washed with water and dried to yield a reddish yellow colored pigment.

EXAMPLE 5

31.3 Parts of 35% HCl was added to a solution of 20.8 parts of 2,5-dimethoxyaniline-4-sulfoanilide in 416 parts of nitrobenzene, and the mixture was cooled and maintained at 0°–5°C. A solution of 6.9 parts of sodium nitrite in 20 parts of water was added dropwise to the solution to conduct a diazotization reaction to give a partially dissolved suspension of a yellow colored diazonium salt.

20 Parts of 35% HCl was added to a suspension of 43.0 parts of 3-acetoacetylamino-4-methoxybenz-2',4'-dimethoxy-5'-chloroanilide in 430 parts of nitrobenzene to prepare a coupling solution. The prepared suspension of the diazonium salt was added to the coupling solution at once, and the mixture was stirred for 10 hours at 20°–30°C to conduct the coupling reaction. After coupling, the reaction mixture was heated at 100°–110°C, stirred for 30 minutes, filtered, washed with methanol, washed with water and dried to yield a yellow colored pigment.

EXAMPLE 6

31.3 Parts of 35% HCl was added to a solution of 15.1 parts of methyl anthranilate in 302 parts of o-nitrotoluene to precipitate the white hydrochloride thereof. A solution of 6.9 parts of sodium nitrite in 20 parts of water was added dropwise to the suspension which was cooled and maintained at 0°–5°C to conduct a diazotization reaction which gave a pale yellow solution of the diazonium salt.

A solution of 16 parts of sodium hydroxide in 90 parts of methanol was added dropwise to a suspension of 26.2 parts of 4,4'-bis-(2'-hydroxy-3'-naphthoylamine)diphenyl in 524 parts of o-nitrotoluene to prepare the coupling solution. (A solution of sodium hydroxide in water in the presence of the diphenyl derivative can be used instead.) The suspension of the prepared diazonium salt was added dropwise to the coupling solution with stirring, and the mixture was stirred for an additional 3 hours at 20°–25°C to conduct the coupling reaction. After coupling, the mixture was heated and methanol and water were evaporated. The residue was refluxed at 220°C for 2 hours with stirring in order to purify and to crystalize the product. The product was cooled to 90°C, filtered, washed with hot nitrotoluene, washed with methanol and then with water. The product was dried and crushed to yield a yellowish red colored pigment.

EXAMPLE 7

31.3 Parts of 35% HCl was added to a solution of 16.2 parts of 2,5-dichloroaniline in 302 parts of nitrobenzene, and the mixture was stirred to precipitate a white hydrochloride. A solution of 6.9 parts of sodium nitrite in 20 parts of water was added dropwise to the cooled suspension and was maintained at 0°–5°C to conduct a diazotization reaction to give a solution of the diazonium salt.

A solution of 16 parts of sodium hydroxide in 90 parts of water was added to a suspension of 24.2 parts of 1,4-bis-(2'-hydroxy-3'-naphthoylamino)-2-chlorobenzene in 482 parts of o-nitrotoluene to prepare the coupling solution. (A solution of sodium hydroxide in water in the presence of the chlorobenzene derivative can be used instead.) The solution of prepared diazonium salt was added dropwise to the coupling solution at 20°–25°C for 3 hours with stirring to conduct the coupling reaction. After coupling, the reaction mixture was heated to evaporate methanol and water, and then the residue was refluxed at 210°C for 2 hours with stirring in order to purify and to crystalize the product. The reaction product was cooled to 90°C, filtered, washed with hot benzene, washed with methanol and then with water. The product was dried and crushed to yield a yellow colored pigment.

EXAMPLE 8

14.6 Parts of concentrated HCl was added to a partial suspension of 6.0 parts of 3-amino-4-chloro-2'-methyl-5'-chlorobenzanilide in 100 parts of nitrobenzene with stirring. 3.5 Parts of a 40% aqueous solution of sodium nitrite was added to a suspension maintained at 5°–10°C. The mixture was stirred for about 30 minutes at the same temperature to yield a partial suspension of a yellow diazonium salt.

A coupling solution was prepared by mixing 3.0 parts of 1,4-bisacetoacetylamino-2,5-dimethylbenzene and 150 parts of nitrobenzene to form a partial suspension. To the suspension was added 10.4 parts of concentrated HCl with stirring at 20°–25°C. The suspension of the diazonium salt was added to the coupling suspension at 20°–25°C for 5 hours with stirring to conduct a coupling reaction until the diazonium salt disappeared. The resulting suspension of the crude pigment in nitrobenzene was heated to evaporate water, and the residue was refluxed for 1 hour with stirring until proper aging was achieved. The produce was cooled to 90°C, filtered, washed with hot nitrobenzene, washed with methanol and then water. The product was dried to yield a pure reddish yellow colored pigment.

EXAMPLE 9

The procedure of Example 8 was followed except that 3.4 parts of 1,4-bisacetoacetylamino-2,5-dichlorobenzene was used instead of 1,4-bisacetoacetylamino-2,5-dimethylbenzene. A pure greenish yellow azo pigment was obtained as the product.

EXAMPLE 10

A mixture of 15.0 parts of glacial acetic acid and 7.3 parts of concentrated HCl was added to a partial suspension of 5.0 parts of 3-amino-4-chlorobenzanilide in 90 parts of o-dichlorobenzene with stirring. 3.5 Parts of a 40% aqueous solution of sodium nitrite was added to the mixture maintained at 5°–10°C, and the mixture was stirred to yield a greenish yellow colored solution of the diazonium salt.

A mixture of 10 parts of glacial acetic acid and 10.4 parts of concentrated HCl was added to a suspension of 2.8 parts of 1,4-bis-acetoacetylaminobenzene in 140 parts of o-dichlorobenzene with stirring to prepare the coupling solution. The mixture was maintained at 10°–15°C and was added to the solution of diazonium salt to conduct a coupling reaction for about 24 hours until the diazonium salt had disappeared.

The resulting suspension of the crude azo pigment in o-dichlorobenzene was heated to evaporate water and acetic acid, and the residue was further heated to the boiling point and was stirred for 3 hours to properly age the solution. The product was filtered at 90°C, and the solvent was removed to yield a pure clean yellow azo pigment.

EXAMPLE 11

The procedure of Example 10 was followed except that 3.2 parts of 1,4-bisacetoacetylamino-2-methyl-5-chlorobenzene was used instead of 1,4-bisacetoacetylaminobenzene. A yellow diazo pigment was obtained as the product.

EXAMPLE 12

The procedure of Examples 4, 5 or 8 was followed, except that a mixture of 60% nitrobenzene and 40% benzene was used instead of nitrobenzene. The same pure azo pigment was obtained when each of the procedures was followed.

EXAMPLE 13

The procedure of Examples 3 or 10 was followed except that trichloroethylene was used instead of o-dichlorobenzene. After coupling was conducted, the mixture was filtered and 150 parts of nitrobenzene was added to the resulting paste. Pure azo pigment product was obtained by the same procedure indicated.

EXAMPLE 14

The procedure of Examples 1–13 were followed, except that hydrogen chloride gas was introduced into the solutions to saturate them instead of concentrated HCl. Pure azo pigment was obtained as the product in each case.

EXAMPLES 15–55

The procedures of Examples 1–14 were followed except that the starting materials shown in the following Table were used. Pure azo pigments were obtained as the product in each case.

| Diazo component | Coupling component | Solvent Diazotization Solution | Solvent Coupling Solution | Color |
|---|---|---|---|---|
| 2-nitro-4-chloroaniline | acetoaceto-2-chloroanilide | trichlene | trichlene | greenish yellow |
| 1-amino-2-methoxybenzene 5-sulfoanilide | 2-hydroxy-3-naphtho-2',4'-dimethoxy-5'-chloroanilide | chlorobenzene | trichlene | bluish red |
| methyl 3-amino-4-chlorobenzoate | 1,4-bis(2'-hydroxy-3'-naphthoylamino)-2,5-dimethyl benzene | o-dichlorobenzene | o-dichlorobenzene | red |
| ethyl 3-amino-4-nitrobenzoate | '' | o-dichlorobenzene | nitrobenzene | brown |
| 3-amino-4-chloro-benz 2'-chloro-4'-trifluoromethylanilide | '' | trichlorobenzene | nitrobenzene | red |
| 2-methyl-3-chloroaniline | 1,4-bis-(2'-hydroxy-3-'-naphthoylamino)-2,5-dichloraniline | trichlorobenzene | nitrobenzene | yellowish red |
| 3-amino-4-chlorobenz 2' chloroanilide | '' | nitrotoluene | nitrobenzene | bluish red |
| 2-nitro-4-trifluoromethylaniline | 1,4-bis-(2'-hydroxy-3'-naphthoylamino)-2-methylbenzene | nitrotoluene | nitrobenzene | reddish brown |
| phenyl 3-amino-4-methylbenzoate | '' | nitrobenzene | nitrobenzene | red |
| 3-amino-4-chlorobenzanilide | 1,4-bisacetoacetylamino-2,5-dichlorobenzene | nitrobenzene | nitrobenzene | greenish yellow |
| '' | 1,4-bisacetoacetylamino-2-chlorobenzene | nitrobenzene | nitrobenzene | greenish yellow |
| '' | 1,4-bisacetoacetylamino-2-methoxybenzene | nitrobenzene | nitrobenzene | orange |
| '' | 1,4-bisacetoacetylamino-2,5-dimethoxybenzene | nitrobenzene | nitrobenzene | reddish orange |

—Continued

| Diazo component | Coupling component | Solvent Diazotization Solution | Solvent Coupling Solution | Color |
|---|---|---|---|---|
| " | 3,3'-dimethyl-4,4'-bis-acetoacetylaminodiphenyl | nitrobenzene | nirobenzene | reddish yellow |
| 3-amino-4-chlorobenz-2'-methyl-5'-chloroanilide | 1,4-bisacetoacetyl-aminobenzene | nitrotoluene | o-dichloro-benzene | yellow |
| " | 1,4-bisacetoacetyl-amino-2,3,5,6-tetra-chlorobenzene | nitrotoluene | o-dichloro benzene | greenish yellow |
| " | 1,4-bisacetoacetyl-amino-2-methyl-5-chlorobenzene | nitrotoluene | o-dichloro-benzene | greenish yellow |
| " | 1,4-bisacetoacetyl-amino-3,6-dichloro-2,5-dimethylbenzene | nitrotoluene | o-dichloro-benzene | greenish yellow |
| 3-amino-4-chlorobenz-2',5'-chloroanilide | 1,4-bisacetoacetyl-aminobenzene | nitrotoluene | chloro-benzene | yellow |
| " | 1,4-bisacetoacetyl-amino-2,5-dimethyl-benzene | nitrotoluene | chloro-benzene | yellow |
| " | 1,4-bisacetoacetylamino-2-methyl-5-chlorobenzene | nitrotoluene | chloro-benzene | greenish yellow |
| " | 1,4-bisacetoacetylamino-2-chlorobenzene | nitrotoluene | toluene | greenish yellow |
| 3-amino-4-chlorobenz-2'5'-dichloroanilide | 1,4-bisacetoacetylamino-2,5-dichlorobenzene | nitrotoluene | toluene | greenish yellow |
| 3-amino-4-chlorobenz-2'methylanilide | 1,4-bisacetoacetylamino-2,5-dichlorobenzene | nitrobenzene trichloro-benzene | dichlorobenzene | greenish yellow |
| " | 1,4-bisacetoacetylamino-2-chlorobenzene | nitrotoluene xylene | nitrobenzene | yellow |
| " | 1,4-bisacetoacetylamino-2-methoxybenzene | α-chloro-naphthalene | xylene trichlorobenzene | reddish yellow |
| " | 1,4-bisacetoacetylamino-2,5-dimethoxybenzene | α-chloro-naphthalene | diphenyl nitrobenzene | — |
| 3-amino-4-chlorobenz-2'-methoxyanilide | 1,4-bisacetoacetylamino-2-methoxy-5-chlorobenzene | nitrobenzene monochloro-benzene | naphthalene monochloro-benzene | reddish yellow |
| 3-amino-4-chlorobenz-2'-methoxyanilide | 1,4-bisacetoacetylamino-2,5-dimethyl-3,6-dichlorobenzene | nitrobenzene benzene | naphthalene monochloro-benzene | greenish yellow |
| " | 1,4-bisacetoacetylamino-2,5-dichlorobenzene | benzene | xylene toluene | greenish yellow |
| 3-amino-4-chlorobenz-2'-methoxy-5'-methyl-anilide | 1,4-bisacetoacetylamino-2,5-dimethylbenzene | bromobenzene | dichlorobenzene | reddish yellow |
| 3-amino-4-chlorobenz-4'-methoxyanilide | " | anisole | nitrobenzene | reddish yellow |
| 4-chloro-3-amino-benz-2',4'-dichloro-anilide | 2-hydroxy-3-naphthoic-2'-naphthylamide | nitrobenzene | nitrobenzene | yellowish red |
| " | 2-hydroxy-3-naphthoic-4'-(2'',5''-dichloro)benzoylaminoanilide | nitrobenzene | o-dichloro-benzene | red |
| 2,5-dichloroaniline | 2-hydroxy-3-naphthoic-4'-(4''methoxy)benzoylamino-2',5'-dimethylanilide | nitrobenzene | o-dichloro- | scarlet |
| 4-methoxy-3-amino-benzanilide | 5-(2'-hydroxy-3'-naphthoyl)animobenzimidazolone | toluene | toluene | bluish red |
| 3-amino-2,4-dichloro-benzo-2',5'-dimethyl-4'-benzoylaminoanilide | 2-hydroxy-3-naphthoic-4'-benzoylamino-2'-methyl-5'-chloroanilide | toluene | toluene | yellowish red |
| " | 2-hydroxy-3-naphthoic-2',5'-dimethyl-4'-benzoyl-aminoanilide | nitrotoluene | nitrotoluene | red |
| N-phenyl-4-amino-phthalimide | " | nitrotoluene | xylene | red |
| 2,5-dimethoxy-1-amino-benzene-4-sulfanilide | acetoaceto-2-methoxy-4,5-dichloroanilide | trichlene | trichlene | reddish yellow |
| dimethyl 3-amino-isophthalate | 5-acetoacetyl-aminobenzimidazolone | nitrobenzene | nitrobenzene | yellow |

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing a high molecular weight azo pigment by coupling a diazo component with a coupling component, the improvement which comprises:

preparing a solution or a partial dispersion of a diazo component by diazotizing a primary aromatic amine in a hydrophobic aromatic solvent having a boiling point greater than 150°C, preparing a solution or a partial dispersion of a coupling component having two coupling positions in said hydrophobic aromatic solvent and forming a coupling reaction mixture by mixing the solution or partial dispersion of the diazo component with the solution or partial dispersion of the coupling component.

2. The process according to claim 1, wherein said coupling reaction mixture in the hydrophobic aromatic solvent is heated at 100°–250°C for 0.5–30 hours with stirring, whereby pure crystals of said azo pigment are obtained.

3. The process according to claim 1, wherein said hydrophobic organic solvent is mono-, di-, tri- or tetrachlorobenzene, nitrobenzene, nitrotoluene or nitrochlorobenzene.

4. The process according to claim 1, wherein a mineral acid is added to the solution or partial dispersion of said coupling component and to the solution or partial dispersion of said diazo compound.

5. The process according to claim 4, wherein said mineral acid is hydrogen chloride.

* * * * *